No. 638,223. Patented Dec. 5, 1899.
M. EVEN.
REVOLVING CHAIR.
(Application filed July 5, 1899.)
(No Model.)
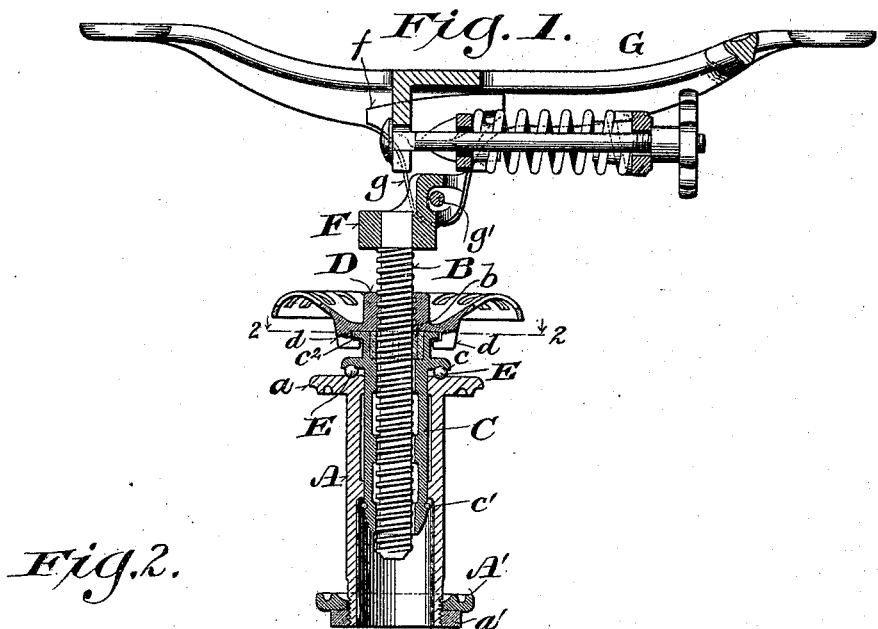
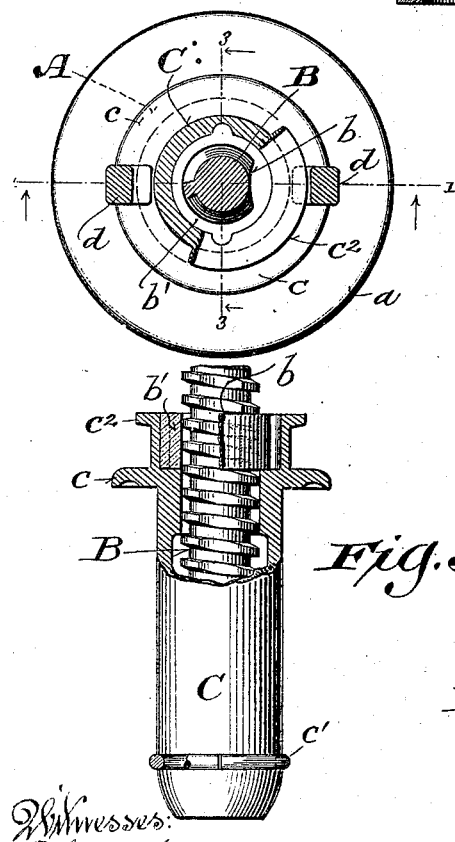
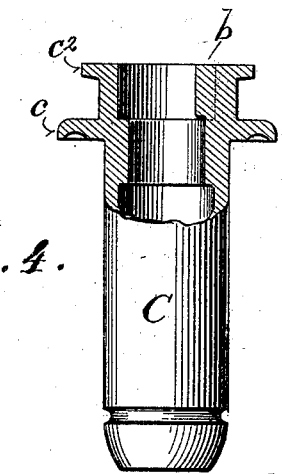
Witnesses:
Inventor:
Michael Even,
Attorneys.

UNITED STATES PATENT OFFICE.

MICHAEL EVEN, OF PORT WASHINGTON, WISCONSIN.

REVOLVING CHAIR.

SPECIFICATION forming part of Letters Patent No. 638,223, dated December 5, 1899.

Application filed July 5, 1899. Serial No. 722,809. (No model.)

*To all whom it may concern:*

Be it known that I, MICHAEL EVEN, a citizen of the United States, residing at Port Washington, in the county of Ozaukee and State of Wisconsin, have invented certain new and useful Improvements in Revolving Chairs, of which the following is a specification, reference being had to the accompanying drawings, forming a part thereof.

My invention relates to that class of revolving chairs in which the chair-seat is adjustable vertically with respect to the base and adapted to turn without affecting its vertical adjustment.

The main object of this invention is to simplify and improve the construction and operation of devices of this class.

It consists in a novel construction and organization of parts hereinafter particularly described, and pointed out in the claims.

In the accompanying drawings like letters designate the same parts in the several figures.

Figure 1 is a vertical section on the line 1 1, Fig. 4, of chair-irons embodying my improvements. Fig. 2 is an enlarged horizontal section on the line 4 4, Fig. 1. Fig. 3 is an enlarged side elevation and vertical section on the line 5 5, Fig. 2, of a part of the spindle and of the swiveling sleeve; and Figs. 4 and 5 are views of a modified construction of the swiveling sleeve, Fig. 4 being a partial side elevation and partial vertical section on the line 6 6, Fig. 5, and Fig. 5 a plan view.

A is a tubular hub constituting a part of a chair-base, the legs being attached thereto in the usual or any suitable way. For the attachment of the legs I have shown in Fig. 1 a flange $a$ formed on the upper end of the hub and having an annular groove in its under face, a ring A' fitted on the lower end of the hub and having a similar groove in its upper face, and a nut $a'$ threaded on said hub for adjustably holding the ring A' in place.

B is a screw-threaded spindle adapted to carry the chair-seat. It is grooved or flattened on one side, as shown most clearly in Fig. 2, to form a longitudinal keyway.

C is a sleeve fitted to turn freely in the hub A and secured therein by an outwardly-projecting flange $c$, formed on its upper end, and a severed ring $c'$, sprung into an external groove at or near its lower end, which extends below an internal shoulder in said hub. The smaller portions of the bore of this sleeve are reamed out to loosely fit upon and form bearings for the spindle B, which is adjustable endwise therein without turning. To hold the spindle from turning in the sleeve, the latter is provided with a key or projection $b$, which engages with the keyway of said spindle, as shown in Figs. 1 and 2. To facilitate reaming the bore of said sleeve, the key $b$ is formed in a ring $b'$, which is fitted in the upper enlarged end of the bore of said sleeve and is held from turning therein by projections on the outer side of said ring engaging with corresponding recesses in the bore of the sleeeve, as shown in Fig. 2. When the sleeve is reamed, this ring is removed, so that the reamer may project through the upper end of the sleeve. The key $b$ may, however, be cast with the sleeve, as shown in Figs. 4 and 5, and the reamer may be inserted through the lower end of the sleeve and advanced therein as far as the key, the bore of the sleeve at its upper end adjacent to the key being formed by a core of sufficient size so that it will require no reaming or finishing to fit or clear the spindle.

D is a nut adapted to fit the thread on the spindle and preferably formed with a handwheel to facilitate the adjustment of the spindle up and down in the sleeve C. It is formed or provided on the under side and on opposite sides of its bore with two inturned lugs $d\ d$, which are adapted to be carried transversely to the bore of the sleeve C into engagement with an annular flange $c^2$ on its upper end, and thus hold the parts together in proper relation to each other when the spindle is inserted through the nut into the sleeve and also prevent removal of the chair-seat from the base when the chair is lifted. An annular groove or ball-race is formed in the under side of the flange $c$, and a corresponding groove is formed in the upper end of the hub A, and balls E are inserted in said grooves to facilitate the turning of the sleeve C in said hub.

It will be seen from the drawings and the foregoing description that when the spindle B is turned in the ordinary use of the chair the sleeve C and the nut D will be turned with it without affecting the vertical adjustment of said spindle and that by turning the nut while the chair-seat is held against rotation the spindle will be raised or lowered in the sleeve C and hub A of the chair-base, said sleeve being held from turning with the nut D by the key $b$ engaging the keyway in said spindle. By screwing the spindle up till its lower end will clear the upper end of the sleeve C it may be removed with the nut from the chair-base by carrying it to one side sufficiently to disengage the lugs $d$ from the flange $c^2$, and by the reverse of these operations the parts may be easily assembled, care being taken to hold the keyway directly opposite the key $b$ as the spindle B is entered into the sleeve C.

F is a head mounted on the upper end of the spindle B.

G is a frame or spider to which the chair-seat is attached. It is preferably pivoted to the head F by a bolt or pin $g'$ passing transversely through upturned arms $f$ on said head and depending ears $g$ on said frame, as shown in Fig. 1, or in any other suitable manner, so as to permit the chair-seat to tilt backward.

Various modifications in the details of the device may be made without departing from the principle and intended scope of my invention.

I claim—

1. The combination with a hub constituting a part of a chair-base, and a screw-threaded spindle adapted to carry a chair-seat and having a longitudinal keyway, of a sleeve secured and adapted to turn freely in the bore of said hub and provided with an annular flange or shoulder on its upper end and with a key or projection arranged to engage with said keyway and prevent the spindle from turning in said sleeve, and a nut engaging the thread on said spindle and provided with a lug engaging the annular flange or shoulder on said sleeve, substantially as and for the purposes set forth.

2. The combination with a hub constituting a part of a chair-base, and a screw-threaded spindle adapted to carry a chair-seat, of a sleeve fitted and adapted to turn in the bore of said hub and provided with an outwardly-projecting ball-bearing and with an outwardly-projecting flange or shoulder at its upper end, balls interposed between said bearing and the upper end of said hub, and a nut engaging the thread on said spindle and bearing on the upper end of said sleeve in revoluble engagement with the flange or shoulder thereon, substantially as and for the purposes set forth.

3. The combination with a hub constituting a part of a chair-base, and a screw-threaded spindle adapted to carry a chair-seat and formed with a longitudinal keyway, of a sleeve fitted to turn in the bore of said hub and to receive said spindle which is adjustable endwise therein without turning, a key adapted to engage the keyway of said spindle and formed with a ring which is held in an enlargement of the bore of said sleeve, and a nut adapted to engage the screw-thread on said spindle and to bear on the upper end of said sleeve, substantially as and for the purposes set forth.

4. The combination with the hub of a chair-base and a screw-threaded spindle adapted to carry a chair-seat, of a sleeve fitted to turn in the bore of said hub and provided at its upper end with an annular flange, means for retaining said sleeve in said hub, means for preventing the spindle from turning in said sleeve, and a nut threaded to engage with the thread of said spindle and provided with inturned lugs adapted to engage with said flange on opposite sides of the spindle, substantially as and for the purposes set forth.

In witness whereof I hereto affix my signature in presence of two witnesses.

MICHAEL EVEN.

Witnesses:
CHAS. L. GOSS,
KENT H. FLANDERS.